United States Patent

Pruitt et al.

[15] 3,647,336

[45] Mar. 7, 1972

[54] MOLD FOR MANUFACTURE OF CORED RUBBER ROLLS

[72] Inventors: Charles N. Pruitt; Douglas L. Segars, both of North Charleston; Walter L. Miller, Goose Creek, all of S.C.

[73] Assignee: Raybestos-Manhattan, Inc., Passaic, N.J.

[22] Filed: Aug. 26, 1970

[21] Appl. No.: 67,040

[52] U.S. Cl. ..........................425/146, 425/DIG. 4, 425/404
[51] Int. Cl. ..........................................................B29f 1/00
[58] Field of Search ................18/30 B, 30 AC, 30 CR, 30 D, 18/30 RV, 30 UM, DIG.4

[56] References Cited

UNITED STATES PATENTS

| 3,344,477 | 10/1967 | Stokis | 18/30 B X |
|---|---|---|---|
| 2,456,778 | 12/1948 | Gilchrist | 18/30 RV UX |
| 2,465,799 | 3/1949 | Gravesen | 18/30 UM X |
| 2,684,502 | 7/1954 | Paulve | 18/30 UM X |
| 2,845,657 | 8/1958 | Beare | 18/30 UM X |
| 2,160,108 | 5/1939 | Beid | 18/30 UM X |

Primary Examiner—H. A. Kilby, Jr.
Attorney—James & Franklin

[57] ABSTRACT

An apparatus for molding a metal-cored rubber roll in which the mold assembly is effectively sealed during cure and vulcanization. The mold assembly comprises a mold casing having a cavity. Rubber is extruded into the mold cavity through a valve mechanism mounted in an aperture communicating with the mold cavity. During cure the increased pressure of the rubber within the mold cavity resulting from the elevated temperature to which the mold is subjected is effective to move the valve mechanism to position effectively sealing the mold cavity whereby the rubber is cured under extremely high pressure. As a result shrinkage is reduced and the tolerances and concentricity of the roll are more uniform and precise.

14 Claims, 6 Drawing Figures

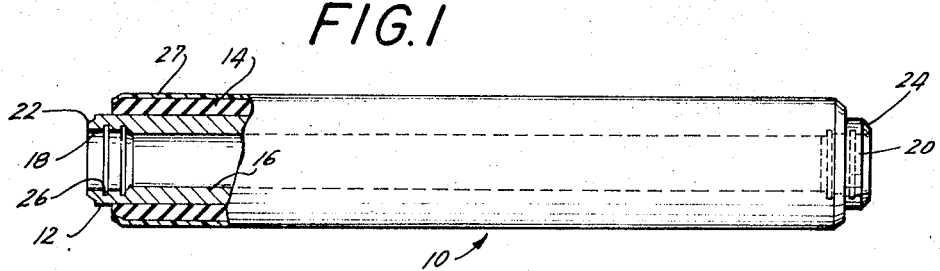
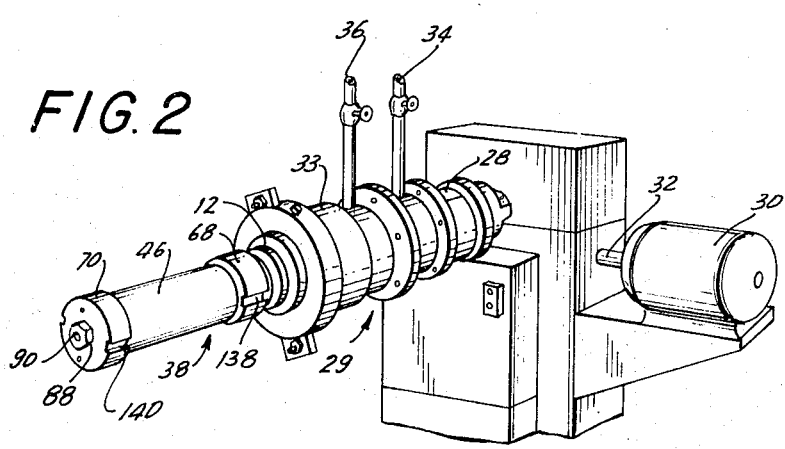
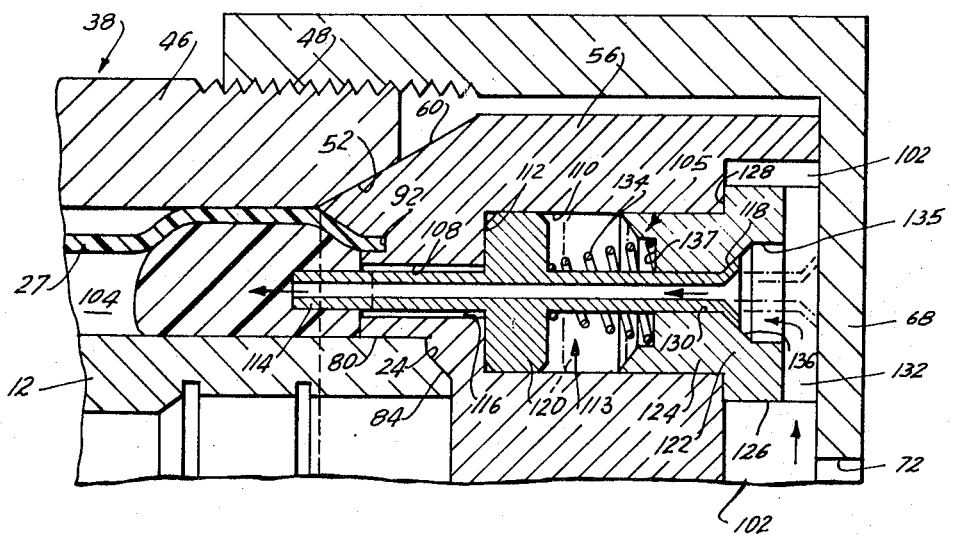
INVENTORS
CHARLES N. PRUITT
DOUGLAS L. SEGARS
WALTER L. MILLER
BY
*James and Franklin*
ATTORNEY

INVENTORS
CHARLES N. PRUITT
DOUGLAS L. SEGARS
WALTER L. MILLER
BY
ATTORNEY

MOLD FOR MANUFACTURE OF CORED RUBBER ROLLS

This invention relates to metal-cored rubber rolls, and more particularly to the manufacture of such rolls made to precise dimension and concentricity.

Rubber rolls have found widespread use in a great variety of applications, such as processing rolls used in the paper and textile industry, printing rolls used for press printing, i.e., ink transfer rolls, and fuser rolls used in xerography copiers. In all of these applications it is highly desirable to provide a roll of precise dimensions, quality and concentricity. The present invention will be disclosed with particular reference to a method and apparatus for manufacturing a fuser roll used in xerographic copying machines. It will be appreciated, however, that the present invention is applicable to the manufacture of rolls for all the foregoing applications and many others.

Fuser rolls of the type herein described are adapted to run against a heated, rigid metal roll and to feed paper therebetween under considerable nip pressure and at high temperatures (above 350° F.) at the metal roll, the print being fused and embedded into the paper at the contact point. For rolls of this type, it has been found desirable to employ an elastomer such as a silicone rubber bonded to the metal core and a thin sleeve of plastic material such as Teflon secured over the rubber body in order to provide a surface resistant to chemical or solvent attack so that it readily releases paper going through the nip.

While a split mold could easily be used, it is found that the resulting orientation of the molecules of the elastomer results in a variable nip pressure around the roll even after removing all flash and after grinding the roll to precise diameter. Accordingly, the preferred method of making such fuser rolls involves the use of a sleevelike mold into which the rubber is forced axially from one end to the other. This might be done by injection molding, but because the elastomer requires a cure of approximately 45 minutes to an hour, compared to a preliminary filling time of approximately 1 or 2 minutes, the expensive injection molding equipment would be unnecessarily tied up for excessive periods of time during each molding operation. Thus, such rolls are commonly formed by extrusion whereby an extruder is used for filling a series of such molds in rapid succession, a large number of such molds then being simultaneously cured in an appropriate autoclave.

Several methods, such as spraying or heat shrinking with the use of adhesives, have in the past been employed to secure the sleeve on the roll subsequent to the molding of the elastomer to the core. A recently developed method which has been found to be particularly effective is described in copending application Ser. No. 9,242 of Leroy R. Rowland et al., filed July 2, 1969, now U.S. Pat. No. 3,613,168 entitled, "Manufacture of Cored Rubber Rolls Having A Sleeve Thereon," and assigned to the assignee of the present invention. This single-step method is characterized by the simultaneous formation of the elastomer on the roll and the placement of the sleeve thereon. The sleeve is placed in a mold casing concentric with and substantially evenly spaced from the metal core and the elastomer is forced into the space between the core and the sleeve. As the mold cavity is filled, the pressure of the rubber on the sleeve causes the sleeve to expand against the inside surface of the casing and to integrally bond with the elastomer.

In all of these prior art processes, it has been found that the finished rolls are deficient in certain respects, resulting in a rather short operating life. The most common mode of roll failure is the separation of the elastomeric cover from the metal core. This separation normally occurs at the end of the roll, and is probably due to the shrinkage of the elastomer.

Shrinkage may be caused by two factors. One of these is the loss of volatiles or molecular rearrangement during cure. The other is due to the differences in shrinkage properties of the elastomeric covering and the metal core. The shrinkage produces a stress between the elastomer and the metal resulting in loss of bond in this area as the elastomer is worked under compression while in operation. Should there be a great difference between the rubber composition and the metal core with regard to the degree of shrinkage, there may be premature loss of bond and thus roll failure.

The thermal coefficient of contraction of silicone rubber compositions varies among different compositions. Some materials having high volumes of filler loading show less shrinkage than materials having low loadings. The softer silicone compositions generally have the highest shrinkage values. As an example, a 60 durometer silicone composition has a thermal coefficient of expansion of approximately $1.39 \times 10^4$. Another composition with a greatly reduced loading has a 16 durometer hardness and a linear coefficient for expansion of $1.80 \times 10^4$. The steel shaft or core to which the silicone rubber composition is bonded has a linear coefficient of expansion of approximately $7.10 \times 10^6$.

Due to the temperature required to effect a cure of the silicone rubber, (approximately 320° to 340° F.), when the cured roll is cooled to room temperature stresses develop between the rubber and the steel, particularly at the roll ends, as a result of the differences in thermal contraction coefficients. These stresses may produce failure of the bond between the two. Thus, rolls of the type herein disclosed made in accordance with prior art processes exhibit, on the average, an operating life of approximately 40 hours. As a result, such rolls must be frequently replaced, thus causing loss of operating time in addition to replacement expense.

Moreover, the dimensional uniformity and precision of rolls formed in this prior art manner leaves much to be desired. This is primarily a result of nonuniform shrinkage during curing. Thus, the elastomer is commonly allowed to bleed through openings in the mold during cure as it expands in response to the increase in temperature. During cooling, there is significant shrinkage of the elastomer and, in the case of the aforementioned single-step method, the sleeve, typically from 3 to 7 percent. As a result, tolerances closer than plus or minus 20 mils on the outer diameter of the roll are difficult to maintain. Moreover, in the single-step method, since the cooling fluid is applied from the outside of the mold, the Teflon sleeve cools first and due to residual stress, may shrink unevenly, thereby drawing the elastomer into a nonconcentric configuration producing warped surfaces and flat spots.

It is, therefore, a primary object of the present invention to provide apparatus for making rubber rolls having more precisely controlled and uniform dimensions and concentricity.

It is a further object of the present invention to provide apparatus for making rubber rolls of the type described wherein shrinkage during curing is considerably reduced.

It is still another object of the present invention to provide apparatus for making cored rubber rolls wherein the bond between the rubber and metal core is considerably strengthened.

It is yet another object of the present invention to provide apparatus for making rubber rolls having a sleeve thereon wherein the sleeve is more firmly secured to the rubber during the molding operation.

It is still another object of the present invention to design a metal cored rubber roll having a sleeve thereon in which distorted operating surfaces and flat spots are eliminated during the molding operation.

It is a further object of the invention to provide a mold assembly which is simple to use and inexpensive to manufacture and is adapted to accomplish all of the above objectives.

It is still a further object of the present invention to provide a valve mechanism for use in a mold assembly which is adapted to control the flow of a moldable material into and out of the mold assembly during extrusion and curing, respectively, in such a manner as to produce a superior product in accordance with the foregoing objectives.

In an application of Hubert W. Inman, Ser. No. 67,041, entitled "Manufacture of Cored Rubber Rolls" filed on Aug. 26, 1970 and assigned to the assignee of the present invention there is described a method of making rubber rolls designed to eliminate the foregoing problems. That process involves the use of removable end caps whereby the mold assembly is effectively sealed prior to cure, producing increased pressures and a denser roll. As a result, shrinkage is considerably reduced and tolerances and concentricity are more uniform and precise. In addition, a superior bond between the core and the rubber and the rubber and the sleeve is effected. The present invention is designed to produce comparable results by the use of a unique mold assembly which obviates the removal and replacement of end caps prior to cure.

To these ends, the mold assembly of the present invention comprises a cylindrical mold casing having a mold cavity. The elastomer is extruded into one end of the casing through a valve mechanism which is biased to the open position. The other end of the casing is provided with narrow ventholes large enough to vent trapped air and gas but small enough to prevent bleed of the elastomer. When the mold is filled it is removed from the extruder and placed in an autoclave for cure. Expansion of the elastomer in response to the elevated curing temperatures causes the valve mechanism to close and effectively seal the mold thereby producing the higher pressures necessary for a superior roll. The valve mechanism is slidably mounted in the entrance end of the mold assembly and may be easily removed for cleaning, repair or replacement.

To the accomplishment of the above and to such other objectives as may hereinafter appear the present invention relates to apparatus for making cored rubber rolls as defined in the appended claims and as described in this specification taken together with the accompanying drawings in which:

FIG. 1 is an illustration partly in section of one example of a cored rubber roll manufactured in accordance with the present invention;

FIG. 2 is a perspective view showing an apparatus which may be employed to carry out the extruding process;

FIG. 4 is a fragmentary sectional view greatly enlarged of the valve mechanism shown in FIG. 3;

Figure 3:
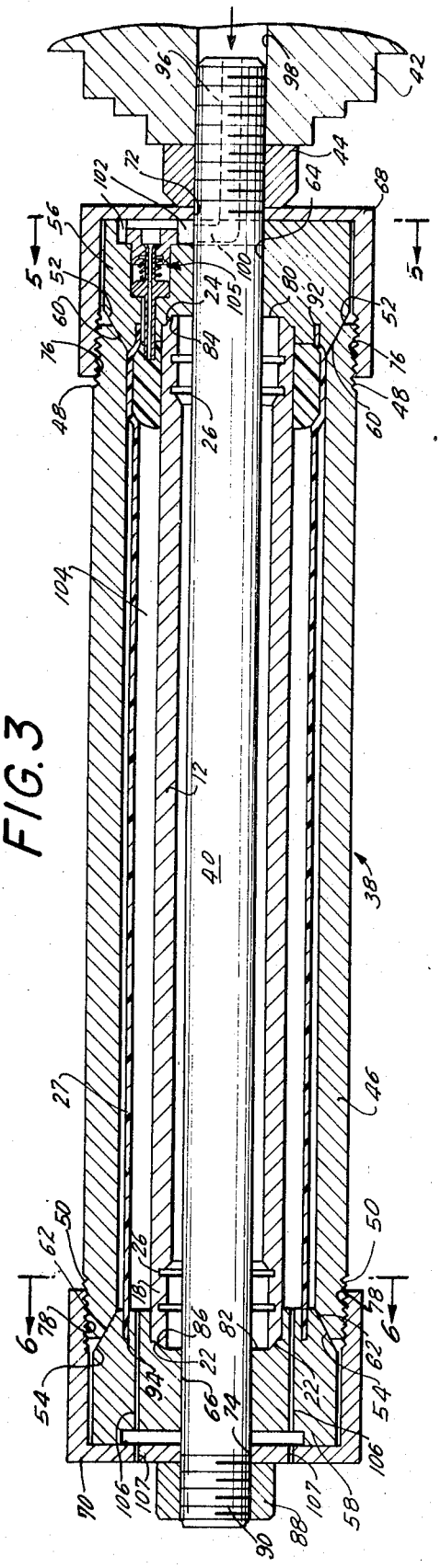
FIG. 3 is a transverse sectional view taken along the longitudinal axis of the mold portion of the apparatus illustrated in FIG. 2 showing the rubber being forced through the valve mechanism into the mold and expanding the sleeve.

Referring to the drawings and specifically to FIG. 1, there is shown a roll generally designated 10 comprising a metal core 12 and a body 14 of elastomeric material concentrically mounted thereon. The core 12 is hollow as indicated at 16, and the ends may be counterbored to a somewhat larger diameter as shown at 18 and 20, to receive appropriate antifriction bearings such as ball or roller bearings. Such bearings may be held in position axially, as by means of snaprings, received in annular grooves 26. The ends of core 12 have tapered corners indicated at 22 and 24 for accurately centering the core in the mold assembly.

A thin sleeve 27 is placed around the elastomer 14 and completely encloses it except for the ends of the roll. The sleeve 27 is preferably composed of a fluorocarbon material and will hereinafter be referred to as Teflon, but may be composed of any equivalent material such as an expandable plastic. The covering 14 may be composed of an elastomer including rubber compounds and many synthetics such as neoprene, silicone or the like. The preferred material for use in fuser rolls of the type herein described is silicone rubber, and thus the elastomer 14 will hereinafter be referred to as rubber. A silicone resin adhesive may be placed between the rubber 14 and the core 12 in order to insure a proper bond between these members. However, such adhesive is preferably not included between the rubber 14 and the sleeve 27 as it will be apparent that such adhesive is unnecessary for a proper bond between these components when made in accordance with the present invention.

The roll 10 illustrated in FIG. 1 is extruded into a mold assembly by an extrusion apparatus such as that shown in perspective in FIG. 2. As there illustrated, the elastomer is passed into a hopper opening 28 in a screw-type extruder generally designated 29. The extruder may be of any of the well-known conventional types and is driven by an electric motor 30 via a drive shaft 32. The extruder chamber 33 is provided with an enclosure and may be heated or cooled as required by means of a fluid passed through the interior of the enclosure by means of pipes 34 and 36.

FIG. 3 is an enlarged cross-sectional view of the mold assembly generally designated 38 showing the extrusion process. As there illustrated a spindle 40 is attached to the discharge end of the extruder 29 by means of an internally threaded adapter 42 and a locknut 44. The spindle serves to removably mount mold assembly 38 in position adjacent extruder 29.

The mold assembly 38 comprises a mold casing 46 having externally threaded portions 48 and 50 on either end thereof. The core 12 is adapted to be centrally mounted within mold casing 46 to provide a uniform annular space for the extruded rubber. For this purpose, the inner wall of casing 46 is provided with tapers 52 and 54 at either end thereof adapted to matingly engage corresponding external tapers 60 and 62, respectively, on end pieces generally designated 56 and 58, respectively. End pieces 56 and 58 are provided with central apertures 64 and 66 adapted to receive spindle 40. The end pieces are secured to casing 46 by means of end caps 68 and 70, respectively, also having central apertures 72 and 74, respectively, adapted to receive spindle 40. As illustrated end caps 68 and 70 are provided with threaded portions 76 and 78, respectively, and are adapted to fit snugly over the corresponding end pieces and threadingly engage the threaded ends 48 and 50, respectively, of casing 46, thereby to urge tapers 60 and 62 into secure engagement with the corresponding tapered end surfaces 52 and 54 of casing 46. The core 12 is received at either end in inwardly facing annular recesses 80 and 82, respectively, in end pieces 56 and 58. Recesses 80 and 82 are provided with internal tapers 84 and 86 respectively adapted to mate with the end tapers 24 and 22 of core 12. It will be apparent that by means of the tapers on casing 46, end pieces 56 and 58, and core 12, the core is accurately centered within the casing upon tightening of end caps 68 and 70 on casing 46.

As previously noted, in one form of the process a Teflon sleeve is formed on the roll simultaneously with the molding of the rubber. Accordingly, as shown in FIG. 3, the thin flexible sleeve 27 is mounted within the mold assembly in the annular space between the casing 46 and core 12. The sleeve 27 is held at either end in annular grooves 92 and 94 formed in end pieces 56 and 58, respectively, adjacent the interior of casing 46. It should be noted however that the sleeve 27 may be placed on the rubber subsequent to the molding process as by heat shrinking or the like, in which case the sleeve will be eliminated from the configuration illustrated in FIG. 3.

In practice, core 12 and sleeve 27 are inserted axially into casing 46 and end pieces 56 and 58 are placed at either end thereof to mount both the core and the sleeve in coaxial spaced relation. End caps 68 and 70 are placed over end pieces 56 and 58 respectively and are screwed onto the casing 46 to secure the parts in assembled condition, the tapers on the core, the casing and the end pieces insuring that the core is accurately centered within the casing. Once the mold is assembled it is mounted over spindle 40 as illustrated and is held in place by a holding nut 88 adapted to be received on the threaded end 90 of spindle 40.

Figure 5:
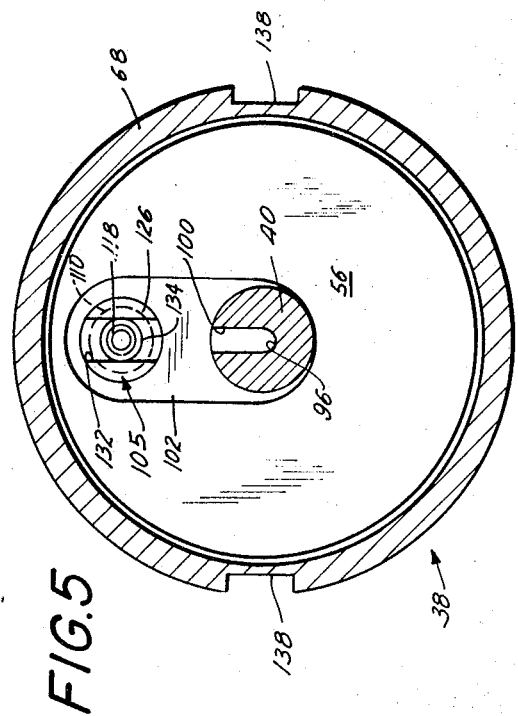
FIG. 5 is a cross-sectional view taken along the line 5—5 of FIG. 3.
Figure 6:
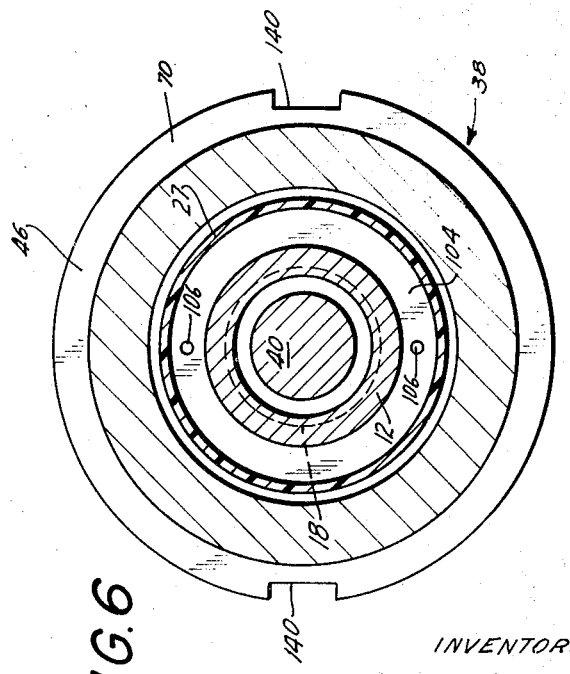
FIG. 6 is a cross-sectional view taken along the line 6—6 of FIG. 3.

Spindle 40 at the inlet end of the mold assembly is provided with a counterbore 96 into which the rubber from the extruder 29 passes as it is discharged through a channel 98 in adapter 42. As best shown in FIG. 5 spindle 40 is provided with an aperture 100 to provide fluid communication between counterbore 96 and an outwardly facing recess 102 formed in end piece 56. As will hereinafter be described with more particularity, a valve mechanism generally designated 105 is mounted in end piece 56 to provide fluid communication between recess 102 and the annular space 104 formed between core 12 and sleeve 27. As the rubber passes into and accumulates in space 104, the sleeve 27 is expanded against the inner surface of casing 46. The accumulated rubber is caused to move along the surface of core 12, and while so moving, to continue to drive sleeve 27 against the interior of casing 46. This is best illustrated in FIG. 3, where the rubber is shown having partially traversed the axial path along the core 12. The rubber is continuously forced into the mold cavity through valve mechanism 105 until all of the annular space 104 is filled. In this manner the sleeve 27 is driven against the interior of casing 46 over its entire length, and due to the extreme pressure of the rubber, the sleeve adheres to the rubber and is bonded thereto without the use of a bonding agent. As best shown in FIG. 6 end piece 58 at the other end of the mold assembly is provided with two small vent passages 106 registering with corresponding passages 107 in end cap 70 to allow for air pockets and trapped gas to be dissipated as the pressure builds in the mold casing. In accordance with the present invention, passages 106 and/or 107 must be small enough to ensure that the rubber does not exit from the mold cavity therethrough.

Grooves 92 and 94 in end pieces 56 and 58, respectively, should be of a width which is large enough to receive the sleeve 27 without difficulty but not so large as to permit the sleeve to shift position during the extrusion process. For a Teflon sleeve of about 0.010-inch to about 0.020-inch thickness, a groove width of about 0.030 inch has been successfully employed to obtain a roll characterized by a smooth wrinkle-free sleeve. A groove depth of between 0.2 inch and 0.4 inch is suitable to maintain the sleeve in contact with end pieces 56 and 58 during the expansion of the sleeve.

Valve mechanism 105 is best illustrated in the enlarged sectional view of FIG. 4. As there shown end piece 56 is provided with an axially extending aperture 108 communicating with the annular space 104 formed between core 12 and sleeve 27. Aperture 108 is counterbored at 110 to a larger diameter, a shoulder 112 being defined between aperture 108 and counterbore 110. A valve member generally designated 113 is adapted to control the flow of rubber through aperture 108 into space 104. To this end valve member 113 comprises an elongated hollow tube 114, one end of which extends through aperture 108 with a clearance 116 therearound and the other end of which is slightly flared at 118. A flange 120 extends radially outwardly from tube 114 and is shown in solid lines seated against shoulder 112. A cylindrical sleeve 122 having a stepped outer diameter is provided at the counterbore opening in recess 102, the smaller diameter portion 124 being sealingly received within counterbore 110 and the larger diameter portion 126 extending across recess 102 to abut end cap 68. The shoulder 128 defined between portions 124 and 126 is thus seated against the recessed surface of end piece 56.

Sleeve 122 is provided with an aperture 130 adapted to sealingly and slidingly receive the flared end of tube 114. Aperture 130 is counterbored at 135 and countersunk at 136 so as to slidingly accommodate the flared end 118 of tube 114, countersink 136 being adapted to seat flared end 118 as illustrated in solid line position.

Valve member 113 is spring biased to the solid line position shown in FIG. 4 by means of a compression spring 134 concentrically mounted around tube 114 between flange 120 and a recess 137 in sleeve 122.

As best seen in FIG. 5 the surface of sleeve 122 abutting end cap 68 is provided with a vertical slot 132 in registration with aperture 135 to provide fluid communication between said aperture and recess 102 in end piece 56.

The space 104 between core 12 and sleeve 27 may be of any suitable dimension and is commonly about one-eighth of an inch, as for example, with a core outside diameter of 1¾ inches and a sleeve inside diameter of 2 inches. The clearance between the sleeve 27 and the interior of casing 46 will depend upon the ability of the sleeve material to expand without rupture. When Teflon is used, expansions of up to 30 percent of the sleeve diameter or more are possible. Thus, the space between the outside surface of the sleeve and the interior of casing 46 should be about one-sixth of the diameter of the Teflon sleeve or approximately one-third of an inch.

In operation the extruder 29 is turned on and rubber is fed into hopper 28. Referring to FIG. 3, rubber is fed through the outlet of the extruder and it is forced through passage 98 in adapter 42 into counterbore 96 in spindle 40 and thence through aperture 100 into recess 102 in end piece 56. As best seen in FIG. 4 the rubber entering recess 102 is forced upwardly through slot 132 in sleeve 122 and enters the flared end 118 of tube 114 via counterbore 135. The rubber thus flows through hollow tube 114 into space 104 expanding the sleeve against the interior of casing 46 as shown. It will be apparent that the pressure of the rubber against the flared end of 118 of tube 114 combined with the force of compression spring 134 on flange 120 will maintain valve member 113 in its left-hand position as indicated by the solid lines in FIG. 4. The operator continues to feed raw rubber into the hopper 28 of extruder chamber 33 until the pressure of the rubber within the mold cavity is effective to prevent further extrusion. This will occur when the pressure reaches approximately 4,500 to 5,000 p.s.i. and results in the rubber backing up in the neck of extruder 29. At this point it will be apparent that the pressure of the rubber within recess 102 on one side of valve member 113 is equal to the pressure of the rubber within the annular space 104 between the core 12 and the mold casing 46. Accordingly valve 113 will remain in its solid line position as a result of the bias of spring 134. The operator then stops the extruder and the mold is detached therefrom by removing locknut 88 and sliding the mold assembly off of spindle 40. The mold is then placed in an autoclave for vulcanization and cure of the rubber at elevated temperatures. During cure and vulcanization the rubber expands in response to the increased temperature. It will be apparent that the pressure of the rubber on the left-hand side of valve member 113 will now be greater than that of the rubber within recess 102 which is vented to atmosphere through the large aperture 72 in end cap 68. Accordingly, as the pressure of the rubber in space 104 rises the resulting force on the left end surface of tube 114 will eventually reach a level sufficient to overcome the bias of spring 134 and valve member 113 will move to the right, coming to rest in the broken line position of FIG. 4. As there illustrated the flared entrance of tube 114 is now sealed by virtue of its abutment against end cap 68. The mold cavity is thus effectively sealed and further expansion of the rubber results in a superior bond between the rubber and the core and the rubber and the sleeve.

If desired, clearance 116 between tube 114 and aperture 108 may be designed large enough to allow for the flow of rubber thereinto in response to the high pressures within space 104. In this case the increased pressure within space 104 will force rubber into clearance 116 between tube 114 and aperture 108 in end piece 56. Thus, the effective area of valve member 113 exposed to the pressure of the rubber within space 104 will include the exposed left-hand surface of flange 120. When the pressure within space 104 rises sufficiently spring 134 will be compressed and valve member 113 will move to the right. Once flange 120 is lifted from its engagement with shoulder 112 in response to this increased pressure additional rubber will flow through clearance 116 and bear against the entire left-hand surface of flange 120 thereby further increasing the effective area of valve 113 subjected to the pressure of the rubber within the mold cavity. It should be noted, however, that in this case the diameter of aperture 108 should be no larger than the outermost diameter of flared end 118 to ensure against premature closing of valve 113 during the extrusion process.

Cooling of the mold after cure may be accomplished by submerging the entire assembly into a bath of relatively cool water. End caps 68 and 70 are then removed and the molded roll is slid out from the mold casing, the finished product being illustrated in FIG. 1.

As best shown in FIGS. 5 and 6, end caps 68 and 70 are both provided with slots 138 and 140, respectively, adapted to receive a spanner wrench for tightening same when assembling and disassembling the mold. The valve mechanism is easily removed for cleaning, repair or replacement merely by sliding sleeve 122 out of counterbore 110 in end piece 56.

It has been found that using the foregoing process and apparatus, a denser and dimensionally more reliable roll is produced. Thus, in one example a 740 base silicone rubber was used with 0.8 part per hundred of Varox curing agent (supplied by R. T. Vanderbilt Co.). The sealed mold was placed in a steam autoclave at 350° F. for 45 minutes. The finished roll had a Shore A Durometer hardness of more than 45. Moreover, it was found that shrinkage during cooling was limited on the average to less than 2 percent of the outer diameter of the roll as compared to shrinkages of from 3 to 7 percent for existing processes. This lowered shrinkage may be due to the compressibility of the silicone rubber under high pressures compared to normal curing pressures. Normal curing pressures may vary from 50 to 1,000 p.s.i. Our improved method results in pressures in excess of 10,000 p.s.i. and normally in the range of 20,000 to 30,000 p.s.i. Finally the tolerances on the concentricity of the outer diameter of the rolls were significantly reduced from approximately ±20 mils to approximately ±10 mils.

Thus it is possible using the mold of this invention to produce rolls having greatly improved dimensional accuracy, concentricity and uniformity.

In addition it was found that, as a result of the increased pressure during curing, the curing time and temperature may be reduced considerably without reducing the hardness of dimensional accuracy of the rolls to an unacceptable level.

Most importantly, the higher pressure during cure results in a denser rubber roll covering and a superior bond between the rubber and the metal core, and, in the case of the single-step method, between the Teflon sleeve and the rubber. As a result, the operating life of such rolls is increased by at least a factor of 3.

Another beneficial result of the extreme pressure cure is the dissipation of stress in the Teflon sleeving. These stresses, most significant in the heat shrinkable sleeving of the two-step process, results in sleeve cracking due to flexing and the premature failure of the roll. Rolls made in accordance with the present invention have exhibited 10 to 20 times the roll life before failure due to sleeve stress.

It will be appreciated from the foregoing that the present invention provides an improved molding apparatus for making a superior cored rubber roll which is simple and inexpensive and requires very little in the way of additional time or equipment. The valve mechanism provides a simple and reliable method of automatically sealing the mold assembly during cure. As a result the hardness, density and dimensional accuracy of the roll are significantly increased and a tighter, more secure bond between the rubber and both the core and sleeve are effected, thereby resulting in a superior product of greatly enhanced operating life.

While only one embodiment of the present invention has been specifically described herein, it will be apparent that many variations may be made therein, all within the scope of the present invention as defined in the following claims:

We claim:

1. In a mold for molding an article of moldable material comprising a mold body having a mold cavity, an opening in said mold body for permitting said material to be forced thereinto, the improvement comprising valve means operatively connected to said mold body and communicating with said mold cavity and in a first position permitting said material to flow through said opening into said cavity, and means sensitive to the pressure of material within said mold cavity, operatively connected to said valve means, and effective to move said valve means from said first position to a second position closing said opening to block the flow of said material therethrough in response to an increase of the pressure of said material within said mold cavity, means biasing said valve means to said first position, said valve means comprising a hollow tubular member slidably mounted in said opening and having one end thereof extending in a direction into said mold cavity, and wall means, spaced from the other end of said tubular member in said first position and adapted to sealingly engage said other end of said tubular member upon slidable movement of said tubular member in a direction out of said mold cavity to said second position in response to an increase in the pressure of said material within said mold cavity.

2. The mold of claim 1, further comprising means for biasing said tubular member away from said wall means.

3. The mold of claim 2, wherein said biasing means comprises spring means.

4. The mold of claim 1, wherein said mold body is provided with small openings therein large enough to vent air and trapped gas from said mold cavity, but too small to permit the flow of said material therethrough.

5. The mold of claim 1, wherein said mold body is provided with removable end caps and wherein said wall means comprises the inner surface of one of said end caps.

6. The mold of claim 4, wherein said mold body is provided with removable end caps and wherein said wall means comprises the inner surface of one of said end caps.

7. The mold of claim 6, wherein the other of said end caps is provided with openings therein communicating with said small openings in said mold body and adapted together with said small openings to vent air and trapped gas from said mold cavity.

8. The mold of claim 6, wherein said one end cap is provided with an opening defining a path for the flow of rubber into said tubular member.

9. The mold of claim 1, wherein said tubular member is provided with flange means extending therefrom and slidably and sealingly engaging the sides of said opening in said mold body, said flange means having one surface thereof in communication with said mold cavity, whereby when said mold cavity is filled with rubber said rubber is forced against said one surface of said flange means to move said tubular member to said second position.

10. The mold of claim 2, wherein said tubular member is provided with flange means extending therefrom and slidably and sealingly engaging the sides of said opening in said mold body, said flange means having one surface thereof in communication with said mold cavity, whereby when said mold cavity is filled with rubber said rubber is forced against said one surface of said flange means to move said tubular member to said second position.

11. The mold of claim 1, wherein said mold body comprises a cylindrical casing and two end pieces, said opening being disposed in one of said end pieces.

12. The mold of claim 1, wherein said mold body comprises a cylindrical casing and two end pieces, said opening being disposed in one of said end pieces.

13. The mold of claim 10, wherein said mold body comprises a cylindrical casing and two end pieces, said opening being disposed in one of said end pieces.

14. The mold of claim 13, wherein said biasing means comprises a sleeve mounting said other end of said tubular member and disposed between said one end piece and said wall means and compression spring means disposed between said flange means and said sleeve, and means defining a passage for the flow of rubber between said wall means and said sleeve to said tubular member when said tubular member is in said first position.

* * * * *